United States Patent
Kayyod

(10) Patent No.: US 11,423,727 B2
(45) Date of Patent: Aug. 23, 2022

(54) COIN PINGER DEVICE FOR ALLOY AUTHENTICATION

(71) Applicant: Farshod Kayyod, Ferndale, MI (US)

(72) Inventor: Farshod Kayyod, Ferndale, MI (US)

(73) Assignee: Farshod Kayyod, Ferndale, MI (US)

( * ) Notice: Subject to any disclaimer, the term of this patent is extended or adjusted under 35 U.S.C. 154(b) by 3 days.

(21) Appl. No.: 17/078,129

(22) Filed: Oct. 23, 2020

(65) Prior Publication Data

US 2022/0130197 A1 Apr. 28, 2022

(51) Int. Cl.
*G07D 5/00* (2006.01)
*G01N 29/04* (2006.01)

(52) U.S. Cl.
CPC ............. *G07D 5/00* (2013.01); *G01N 29/045* (2013.01); *G01N 2291/014* (2013.01); *G01N 2291/0234* (2013.01); *G07D 2205/00* (2013.01)

(58) Field of Classification Search
CPC .... G07D 5/00; G07D 2205/00; G01N 29/045; G01N 2291/0234; G01N 2291/014
USPC .............................................................. 73/12
See application file for complete search history.

(56) References Cited

U.S. PATENT DOCUMENTS

| 188,637 A | * | 3/1877 | Hopkins | G01N 3/307 73/11.01 |
| 5,630,494 A | * | 5/1997 | Strauts | G07D 3/06 194/317 |

FOREIGN PATENT DOCUMENTS

| DE | 202007011887 U1 | * | 2/2008 | ......... A45D 26/0066 |
| EP | 0360506 A2 | * | 3/1990 | ............... G07D 5/00 |
| ES | 305378 B1 | * | 5/1999 | |
| JP | 3637062 B2 | * | 4/2005 | ............... G07D 5/02 |

OTHER PUBLICATIONS

Translation DE-202007011887-U1 (Year: 2007).*
Ringer written description Wayback Machine Dec. 24, 2014 and https://www.thefisch.com/howitworks written description (Year: 2014).*
Ringer image capture provided and image screen capture YouTube Jun. 18, 2014 youtube.com/watch?v=boB$yyS-fDK; (Year: 2014).*

* cited by examiner

*Primary Examiner* — Alexander A Mercado
*Assistant Examiner* — Monica S Young

(57) ABSTRACT

An apparatus and method facilitating a coin ping test that involves placing a coin in between two prongs that are covered with caps made of silicone, fabric, soft plastic, and/or other material or combination of materials that pinch and grip the coin tightly in place for a ping test. The elasticity of the caps also allows for the coin to be pressed down on one edge and then released, resulting in the coin snapping back down onto a hammer or surface causing the coin to ping on contact.

3 Claims, 3 Drawing Sheets

COIN PINGER DEVICE FOR ALLOY AUTHENTICATION

BACKGROUND

Field of the Invention

The present inventions relate to identifying coins, and more specifically identifying the authenticity, denomination, type, date, and mint of coins which may be used to determine acceptance or rejection of coins by said attributes and/or for the correct coin promotion in a coin counter.

Description of the Related Art

Coin identification methods are often used for the purposes of determining the denomination and authenticity of coins and often for the purposes of mechanically discriminating coins based on that information. The most common coin discrimination devices, such as those used in automatic vending machines, coin-to-currency changers, gaming devices such as slot machines, bus or subway token "fare boxes", and the like, generally employ inductive coin testing methods to determine the denomination and authenticity of coins. These methods typically work by measuring the effect of a coin on an alternating electromagnetic field produced by one or more coils disposed at a passage through which a coin passes. The effect of the coin on the impedance of the coil(s) is dependent on one or more of the properties of the coin such as diameter, thickness, conductivity and permeability. The detection signals output from coil sensors of this type are concentrated in a basic pattern representative of these characteristics of the coin. By comparing the measured pattern with patterns established in advance, the genuine or counterfeit nature of the coin, and the denomination of the coin, can be determined.

More recently, optical sensors have been implemented to provide another method, or additional criteria, by which the denomination and authenticity of a coin may be determined. Optical sensor methods have been primarily directed towards the discrimination among coins of similar electromagnetic and physical properties, yet not authentic with respect to a specific sovereignty, such as coins originating from a foreign country or entity. In such methods, an optical sensor typically captures a two-dimensional image of a coin surface such as one of the faces, the periphery, or the ridge of the coin which is then used to perform pattern matching by comparing the acquired coin image to patterns of known coins to produce a discrimination signal. However, little effort has been directed towards the automated identification of coinage features deliberately minted, yet not universally present on coins of the same denomination or type, such as details indicating the date and the location of mint of a coin. Such information is desirable as it can be a source of novelty, entertainment and appreciation. Additionally, certain coins of particular date and mint are considered "rare" and are thus more valuable than coins of similar denomination yet produced with a differing date or mint. Currently, identifying and retrieving coins of specific date and mint from general circulation is difficult and time consuming. Date and mint information is typically determined "by eye," sometimes with the aid of magnification, and can often be taxing on the individual as the examination of a large number of coins can be tedious and time consuming. There is currently no device which automates the identification of these coin attributes, nor one which can do so at high speed and low cost.

A number of devices are intended to identify and/or discriminate coins or other small discrete objects. One example is coin counting or handling devices, (such as those described in U.S. patent application Ser. No. 08/255,539, now U.S. Pat. No. 5,564,546, and its continuation application Ser. Nos. 08/689,826, 08/237,486, now U.S. Pat. No. 5,620,079 and its continuation Ser. No. 08/834,952, filed Apr. 7, 1997, and Ser. No. 08/431,070, all of which are incorporated herein by reference). Other examples include vending machines, gaming devices such as slot machines, bus or subway coin or token "fare boxes," and the like. Preferably, for such purposes, the sensors provide information which can be used to discriminate coins from non-coin objects and/or which can discriminate among different coin denominations and/or discriminate coins of one country from those of another.

Similarly, a digital advancement in similar field is Pingcoin which is the digital version of the classical "ping test" for catching counterfeit coins. By recording and analyzing the sound produced by your coins the app is able to tell you if the coin is genuine or fake.

It is oftentimes desirable in the sorting of coins to discriminate between real coins and fake coins. There are multiple solutions that have been presented in prior art. However, these solutions are limited and restricted to their conventional architecture, installation system and have considerable shortcomings which adversely affect the convenience with which they can be used. The prior systems have certain limitations including the design of assemblies which make them not suitable for every type of user. Moreover, the ease of use ability of these assemblies is also questionable.

It has to be noted that this, Pocket Pinger, invention proposes an apparatus for the advancement of the common coin ping test, an improved testing method that allows the user to test a coins authenticity by the sound the coin makes when pinged. This apparatus tightly holds a coin in between two pinchers that are covered with protective caps made of silicone, fabric, soft plastic or any material or combination of materials that's purpose is to grip the coin tightly while allowing the coin to vibrate and ping during the ping test. The elasticity of the caps also allows for the coin to be pressed down on the coins edge away from the device and then released, resulting in the coin snapping back down and bouncing on a hammer or surface causing the coin to ping on contact. The protective caps also mitigate any potential scratches to the obverse and reverse surfaces of the coin.

Other known prior art patents are USA100187936 a balance device for the detection of counterfeit coins, US009934639 a method for magnetic detection of anomalies in precious metals, US010417855 a sensor system defining a sample region for detecting fake or altered bullion coins and metals, US005551542 a rotating coin identifier and separating device US20150308983, a transducer that vibrates a material to its natural frequency and collects the amplitude response and compares with a reference data set.

None of the previous inventions and patents, taken either singly or in combination is seen to describe this invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary desirable objective of the present invention is to provide a novel and improved form of a coin ping test.

Another intention of the present invention is to provide an advanced methodology where the coin is held in between two prongs that are covered with protective caps that's purpose is to grip a coin and mitigate potential damage that can happen during the coin ping test.

Another objective of this invention is to provide a new and improved procedure where the elasticity of the caps allows for the coin to be pressed down on the coins edge away from the device and then released, resulting in the coin snapping back down and bouncing on a hammer or surface causing the coin to ping on contact.

Another objective for the invention is to provide a main assembly where the caps over the prongs protect the coin from scratching while tilting and/or vibrating during the ping test.

Another objective for the invention is to provide a reliable construction that is suitable for all types of coins whether gold, silver, or any other coin with precious or non-precious metals.

The invention as per its further embodiments helps in determining if a coin is a counterfeit or a genuine authentic coin.

It is a further aspect of the present invention to provide a new and improved methodology of a ping test which is reliable and has sustained its results under various circumstances.

Thus, it is the objective to provide a new and improved method of ping testing a coin while protecting the obverse and reverse surfaces of the coin. Other aspects, advantages and novel features of the present invention will become apparent from the detailed description of the invention when considered in conjunction with the accompanying drawings.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
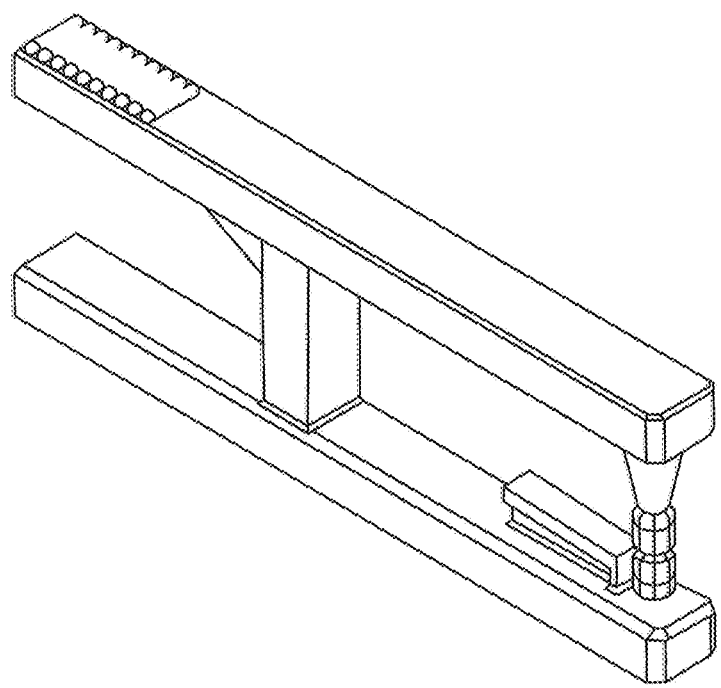
FIG. 1 shows the device with protective caps over the pinchers to keep the coin safe.
Figure 2:
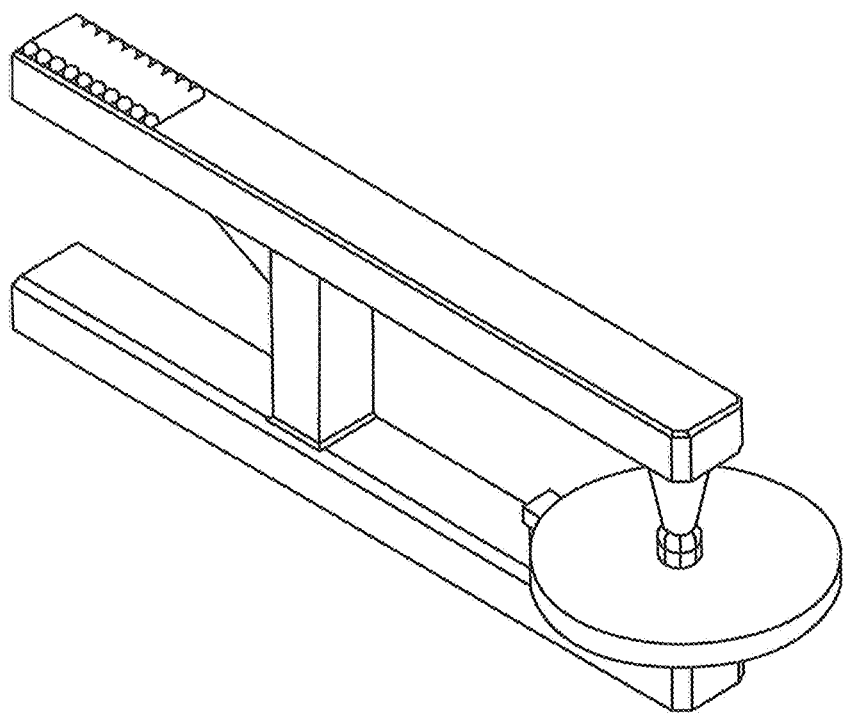
FIG. 2 shows a coin held tightly in the device in between the protective caps ready for the ping test.
Figure 3:
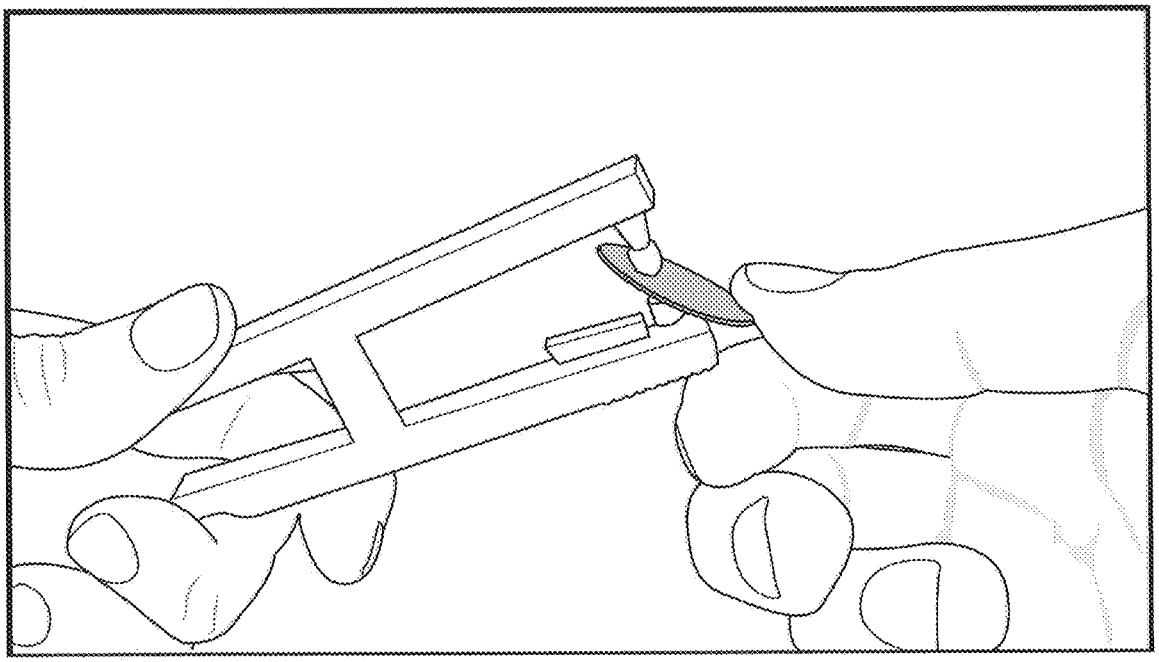
FIG. 3 shows the functionality where a user can press on the coins edge and release which causes the coin to snap back down in the other direction and make contact with the hammer creating a vibration and ping sound from the coin.
Figure 4:
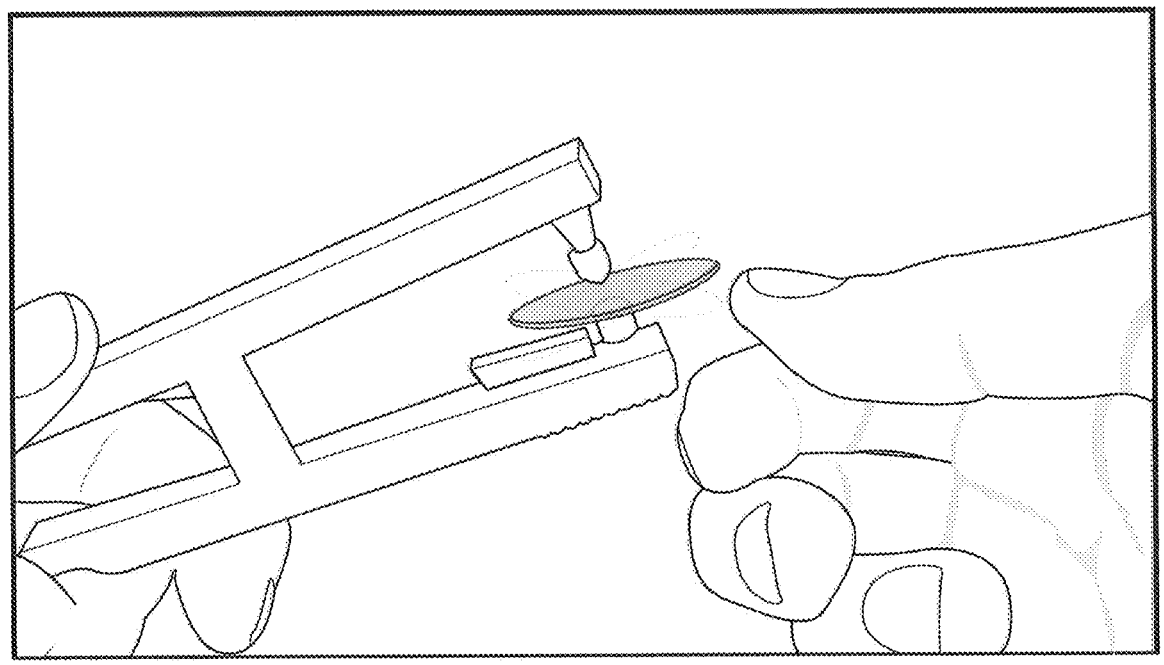
FIG. 4 shows how the coin vibrates in between the two caps during the ping test.
Figure 5:
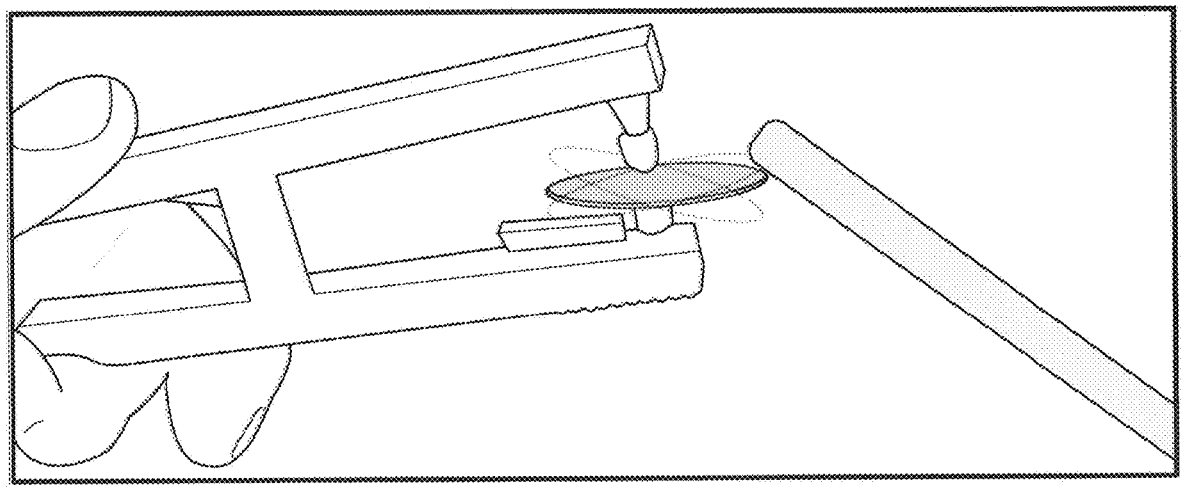
FIG. 5 shows an external object, in this case a rod, striking the coin and causing the coin to ping and vibrate.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The present invention is directed to provide a method of ping testing a coin by tightly griping a coin in between two prongs that are covered with protective caps made of silicone, fabric, soft plastic, or other material or combination of materials that pinch the coin tightly in position for the duration of the ping test. The elasticity of the caps also allows a coin to be pressed down on the coins edge away from the device and then released, resulting in the coin snapping back down onto a hammer or surface causing the coin to make a distinctive ping sound.

One easy way to determine a coin's authenticity is by using the weight to size comparison method. Gold and silver are extraordinarily dense metals—much denser than just about any other base metal. Just about all fakes that weigh the correct amount will be too large in diameter and/or thickness. Or they will be underweight in order to achieve the correct diameter and thickness. Simply comparing the diameter and thickness of the coin in question with others known to be genuine could be enough to put you at ease.

However, to enhance the reliability, a ping test is commonly used at the consumer level. Typically, a consumer will balance a coin on their fingertip and strike the coin with an external object causing the coin to ping. Authentic gold and silver coins chime when struck and the difference in sounds is noticeable versus other base metals. The gold coin ping test is a very reliable and quick way to test whether the gold coin is real or not. If someone gently strikes the precious metal coin with another object it will make a very distinct ringing or "ping" sound as opposed to other base metals whose respective sound will be very different. An authentic 22 k (91.6%) gold coin for instance will have a very loud and long resonant tone whereas a counterfeit will make a much different sound, duration, and tone. Some counterfeits will not make a pinging sound at all. The ping test is most reliable when the user is comparing the sound of the coin in question to a coin that is known to be genuine.

The current invention allows the user to tightly hold the coin in place between the two pinchers with protective caps, which allows the coin to be safely struck or pressed down on one edge and released, the coin then snaps back down and bounces on the hammer causing the coin to ping on contact.

The invention as per its preferred embodiments is a procedure where a coin is placed in the device between two prongs that are covered with protective caps that grip the coin tightly in place. These caps mitigate the risk of a scratch on the obverse and reverse surfaces of the coin during a ping test while firmly holding the coin allowing for vibration. The elasticity of the caps also allows the coin to be pressed down on one edge and then released, resulting in the coin snapping back down onto a hammer or surface causing the coin to vibrate and ping on contact.

While a specific embodiment has been shown and described, many variations are possible. With time, additional features may be employed. The particular shape or configuration of the platform or the configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A device for performing a coin ping test comprising:
   two connected prongs, each prong having a pincher at their respective end to meet together to pinch a coin, with at least a contact surface area of each pincher covered with a respective cap;
   wherein each cap is made of an elastic gripping material;
   wherein the pair of pinchers are configured to grip the center of the coin and allow the coin to be pressed down on an edge of a coin outer rim by a user;
   wherein when the pressed down coin outer rim is released, the device is configured to snap the coin back such that the coin outer rim hits a surface of a protrusion formed on one of the two prongs; where the protrusion is adjacent to the pincher of the one of the two prongs and where the hit causes the coin to ping and vibrate while being gripped between the pair of pinchers.

2. The device for performing a coin ping test of claim 1, where the coin gripped in the pinchers is configured to be directly struck by a plastic rod, pencil, or other object.

3. The device for performing a coin ping test of claim 1, wherein the elastic gripping material is made of at least one of silicon, fabric or plastic material.

* * * * *